United States Patent
Xia et al.

(10) Patent No.: US 11,906,546 B2
(45) Date of Patent: Feb. 20, 2024

(54) COATED ACTIVE CANTILEVER PROBES FOR USE IN TOPOGRAPHY IMAGING IN OPAQUE LIQUID ENVIRONMENTS, AND METHODS OF PERFORMING TOPOGRAPHY IMAGING

(71) Applicants: MASSACHUSETTS INSTITUTE OF TECHNOLOGY, Cambridge, MA (US); NANO ANALYTIK GMBH, Llmenau (DE); SYNFUELS AMERICAS CORPORATION, Sterling, VA (US)

(72) Inventors: Fangzhou Xia, Cambridge, MA (US); Chen Yang, Cambridge, MA (US); Yi Wang, Cambridge, MA (US); Kamal Youcef-Toumi, Cambridge, MA (US); Christoph Reuter, Llmenau (DE); Tzvetan Ivanov, Llmenau (DE); Mathias Holz, Llmenau (DE); Ivo Rangelow, Baunatal (DE)

(73) Assignees: Massachusetts Institute of Technology, Cambridge, MA (US); Nano Analytik GMBH, Llmenau (DE); Synsfuels Americas Corporation, Sterling, VA (US)

( * ) Notice: Subject to any disclaimer, the term of this patent is extended or adjusted under 35 U.S.C. 154(b) by 0 days.

(21) Appl. No.: 17/623,789

(22) PCT Filed: Jul. 6, 2020

(86) PCT No.: PCT/US2020/040920
§ 371 (c)(1),
(2) Date: Dec. 29, 2021

(87) PCT Pub. No.: WO2021/003483
PCT Pub. Date: Jan. 7, 2021

(65) Prior Publication Data
US 2022/0244288 A1    Aug. 4, 2022

Related U.S. Application Data

(60) Provisional application No. 62/870,668, filed on Jul. 3, 2019.

(51) Int. Cl.
*G01Q 10/04* (2010.01)
*G01Q 20/04* (2010.01)
(Continued)

(52) U.S. Cl.
CPC ........... *G01Q 10/045* (2013.01); *G01Q 20/04* (2013.01); *G01Q 30/14* (2013.01); *G01Q 70/08* (2013.01)

(58) Field of Classification Search
CPC ...................................................... G01Q 30/14
See application file for complete search history.

(56) References Cited

U.S. PATENT DOCUMENTS 6,196,061 B1   3/2001   Adderton et al.
8,128,252 B2   3/2012   Yasuda et al.
(Continued)

FOREIGN PATENT DOCUMENTS

DE   102007060460 A1   6/2009
EP       2725332 A1   4/2014
(Continued)

OTHER PUBLICATIONS

Fantner et al. 'Use of self-actuating and self-sensing cantilevers for imaging biological samples in fluid', 2009, Nanotechnology, 20, 432003 (Year: 2009).*

(Continued)

*Primary Examiner* — Eliza W Osenbaugh-Stewart
(74) *Attorney, Agent, or Firm* — Barnes & Thornburg LLP

(57) ABSTRACT

Active cantilever probes having a thin coating incorporated into their design are disclosed. The probes can be operated in opaque and/or chemically harsh environments without the need of a light source or optical system and without being (Continued)

significantly negatively impacted by corrosion. The probes include a substrate that has a cantilever, a thermomechanical actuator associated with the cantilever, a piezoresistive stress sensor disposed on the cantilever, and a thin coating disposed on the cantilever and the piezoresistive stress sensor. The coating is bonded to the substrate, is thermally conductive, and has a low thermal resistance. Further, the thin coating is configured to have little to no impact on one or more of a mass of the active probe, a residual stress of the cantilever, or a stiffness of the active probe. Techniques for performing topography and making other measurements in an opaque and/or chemically harsh environment are also provided.

13 Claims, 8 Drawing Sheets

(51) Int. Cl.
   *G01Q 30/14* (2010.01)
   *G01Q 70/14* (2010.01)
   *G01Q 70/08* (2010.01)

(56) References Cited

U.S. PATENT DOCUMENTS

| | | |
|---|---|---|
| 2005/0052489 A1 | 3/2005 | Kim et al. |
| 2005/0225011 A1 | 10/2005 | Rangelow et al. |
| 2009/0139340 A1 | 6/2009 | King et al. |
| 2009/0222958 A1 | 9/2009 | Su et al. |
| 2011/0209553 A1 | 9/2011 | Crivelli |
| 2013/0101466 A1 | 4/2013 | Adams et al. |
| 2013/0133433 A1 | 5/2013 | Yoshikawa et al. |
| 2013/0276176 A1* | 10/2013 | Polesel-Maris ........ G01Q 60/42 850/40 |
| 2015/0377921 A1 | 12/2015 | Ukraintsev et al. |
| 2020/0124636 A1* | 4/2020 | Ziegler .................. G01Q 70/10 |

FOREIGN PATENT DOCUMENTS

| | | |
|---|---|---|
| WO | 2009040236 A1 | 4/2009 |
| WO | 2014102187 A2 | 7/2014 |

OTHER PUBLICATIONS

Rogers et al., 'High speed tapping mode atomic force microscopy in liquid using an insulated piezoelectric cantilever,' 2003, Review of Scientific Instruments, Vo. 74, No. 11, pp. 4683-4686 (Year: 2003).*

"Design and Control of a Multi-Actuated High-Bandwith and Large-Range Scanner for Atomic Force Microscopy," Annual American Control Conference (ACC), pp. 4330-4335, 2018.

Kontakt Chemie, "Technical Data Sheet," <https://www.tme.eu/Document/b7a6a16ed14d2aa6149ed9a14fb1b03d/TKC3%20POSITIV20.DTE.PDF>.

Hui et al. Graphene Coated Nanoprobes: A Review. Crystals 7(269), 2017 . [retrieved on Oct. 21, 2020]. Retrieved from the Internet. <URL: https://www.mdpi.com/2073-4352/7 /9/269/pdf>.

International Search Report issued for PCT/US2020/040920 dated Nov. 5, 2020 (3 pages).

Ivanov, et al., "Thermally driven micromechanical beam, with piezoresistive deflection readout," Microelectric Engineering, pp. 67-68, 550-556, 2003.

Rangelow, et al., "Active Scanning Probes: A Versatile Toolkit For Fast Imaging and Emerging Nanofabrication," Journal of Vacuum Science & Technology B, 2017.

Sitterberg et al., "Utilizing atomic force microscopy for the characterization of nanoscale drug delivery systems," European Journal of Pharmaceutics and Bipharmaceuticals, pp. 2-13, 2010.

Xia et al., "Light's Off! Nano-scale Topography Imaging of Sample Surface in Opaque Liquid Environments with Coated Active Cantilever Probes," Nanomaterial, pp. 1-11, 2019.

Xia et al., "Modular Low-cost Active Probe Atomic Force Microscope Design for Engineering Education," Nanotechnology, 2020.

* cited by examiner

COATED ACTIVE CANTILEVER PROBES FOR USE IN TOPOGRAPHY IMAGING IN OPAQUE LIQUID ENVIRONMENTS, AND METHODS OF PERFORMING TOPOGRAPHY IMAGING

CROSS REFERENCE TO RELATED APPLICATIONS

This application is a U.S. national counterpart application of international application serial No. PCT/US2020/040920 filed Jul. 6, 2020, which claims priority to and the benefit of U.S. Provisional Patent Application No. 62/870,668, filed Jul. 3, 2020, the disclosures of which are hereby expressly incorporated by reference in their entireties.

FIELD

The present disclosure relates to devices and methods for performing topography imaging, and more particularly relates to coated active probes configured for use in topography imaging in opaque and/or chemically harsh liquid environments, as well as methods of operating such probes. Notably, the present disclosures can also be applied to devices and methods for making other measurements, such as mechanical properties of an environment, and thus are not solely limited to use in topography imaging.

BACKGROUND

An Atomic Force Microscope (AFM) is a nano-scale topography imaging tool widely used in high-tech industries and nanotechnology researches. AFMs can conduct imaging in ambient air, transparent liquids and ultra-high vacuum (UHV) without special requirements on the sample (e.g., conductivity). The ability to take images in diverse environments makes the AFM an ideal tool for chemistry and biology researches when liquid and solid interfaces exist quite often. With the presence of a cantilever probe, the amplitudes, phases, and frequencies of various modes of resonance can be utilized. This permits mapping of mechanical characteristics such as stiffness and damping in addition to topography. Moreover, the AFM can create nanoscale patterns with lithography techniques using a conductive probe or obtain mapping of sample chemical identity when combined with optical spectroscopy techniques.

Conventional AFMs utilize an Optical Beam Deflection (OBD) system to amplify the cantilever probe deflection caused by the nano-scale topography variation. In this set-up, a beam of monochromatic coherent light, typically produced by a laser source with mode hopping compensation circuitry, is focused on the reflective back of the cantilever probe at an angle. The small deflection of the cantilever probe tip causes a small change in relative angle between the incident light and reflective probe back. The optical path amplifies this change to a larger movement and a four-quadrant photodetector is used to convert it into an electrical signal for data acquisition systems to process. Successful implementation of the OBD system allows low-noise sub-nanometer resolution for topography measurement. With a typical size on the order of tens of microns, the laser spot size can be further reduced with high numerical aperture objective lens to work with smaller cantilever probes in high-speed AFM imaging systems. However, the OBD system suffers from several limitations. First, the monochromatic light utilized in the OBD system requires optical transparency between the laser source and the back surface of the probe. This requirement prevents the application of conventional AFMs to environments with opaque liquids. Second, the alignment of the micron scale laser spot with the cantilever probe tip can be a time-consuming task. The alignment can be even more difficult when operating in transparent liquid environments due to the multiple changes of refraction indices for different materials. Third, in tapping mode operation, spurious modes of resonance can be excited in the structure from vibrating piezo element(s). Photothermal actuation can alleviate this phenomenon but complicates the optical system alignment even more. Still further, the requirement of fixed relative position between the probe and the bulk optical components makes probe scan challenging to implement.

On the other hand, opaque liquid environment has practical importance in many areas of research. For example, in the refinery industry, crude oil is produced from a porous network of minerals (e.g., mica, silica, etc.) with a mixture of oil and water. In this case, the wettability of the mineral determines the fluid distribution. This, in turn, can affect the flow transport in crude oil reservoirs. As crude oils contain many polar compounds, these compounds can be absorbed by the minerals and alter the effective wettability for oil or water. Hence, it can be important to understand the residual formation of crude oil components on the minerals in the reservoirs. Apart from conventional measurement of wetting angle, previous AFM studies focused on nano-mechanical properties of residual formation after oil exposure. Attempts to mimic the crude oil natural environment has been made with imaging in transparent liquid such as water or decane for AFM imaging. However, due to the requirement of optical transparency, conventional AFM set-up with an OBD system cannot be utilized to image a wide variety of crude oil samples when non-hydrocarbon with dark color is present in the mixture.

Another important area of application that can benefit from opaque liquid imaging capability is in biology research. In the case of the most common fluid in the human body, namely, whole blood, AFM images of cells cannot be conducted directly with conventional AFM due to the opacity. For imaging, red blood cells are typically isolated from the plasma, treated with glutaraldehyde to render them rigid, and attached to a glass slide with coating (e.g., fibrinogen). Although the treatment procedure allows conventional AFM imaging of red blood cells, the treatment not only removes the cells form their native environment, but also kills them outright by severely impacting their biological functionality. Additionally, there are many other potential applications of opaque liquid AFM imaging in chemistry and material science that involve non-transparent liquid reaction on solid surfaces.

To the extent devices, such as active cantilever probes, have been developed to help overcome the deficiencies of conventional AFM set-ups, they have their limitations as well. For example, functional components of the probes can be electrically shorted or mechanically damaged by corrosive chemicals. To the extent any probes may exist that do not require a light source to operate, they typically are not capable of operating in a chemically harsh environment. For example, some active probes may include a tuning for structure for vibration excitation and measurement. However, such structures are ill-suited for use in liquids and/or harsh environments at least because of the presence of multiple oscillators (e.g., probe tip and tuning fork). Still further, probes that may not require a light source and/or are capable of operating in a chemically harsh environment cannot typically operate at the frequencies necessary to make measurements. This can be because, for example, the tips are not suitable to handle such frequencies.

Accordingly, there is a need for producing devices capable of operating to perform topography in opaque and/or harsh environments, particularly at a micro and/or nano-scale, without light sources. There is a further need to provide methods of performing topography in natural environments, which may be opaque and/or chemically harsh, again particularly at a micro and/or nano-scale, and also without light sources.

SUMMARY

The present application is directed to active cantilever probes that are used in topography imaging. The devices and methods disclosed allow for such probes to be used in liquid environments, including those that are opaque and/or chemically harsh, without the use of any light sources, including lasers, and/or optical systems. Further, such probes can be used on a very small scale, including for nano-scale topography imaging.

More particularly, the active cantilever probes include a coating that serves to protect the components of the active cantilever probe (e.g., a substrate, a thermomechanical actuator, a piezoresistive stress sensor) while having little to no impact on the thickness of the active probe, a mass of the active probe, a residual stress of the cantilever of the active probe, and/or a stiffness of the active probe. The coating is thin (e.g., approximately in the range of about 0.01 micrometers to about 10 micrometers), and often uniform, and can be strongly bound to a substrate of the active cantilever probe.

In one exemplary embodiment an active probe includes a substrate, a thermomechanical actuator, a piezoresistive stress sensor, and a thin coating. The substrate includes a cantilever that has a base region and a tip region. The thermomechanical actuator is associated with the cantilever (e.g., coupled or attached) and is configured to cause the cantilever to deflect. The piezoresistive stress sensor is disposed on the cantilever at the base region (alternatively, could be proximate to the base region) and is configured to measure deflection of the cantilever at the tip region (alternatively, could be proximate to the tip region). The thin coating is disposed on the cantilever and the piezoresistive stress sensor. It is bonded to the substrate, it is thermally conductive, and it has a low thermal resistance. Further, the thin coating is configured to have a negligible impact, or no impact, on at least one of a mass of the active probe, a residual stress of the cantilever, or a stiffness of the active probe.

The thermomechanical actuator can include a heating element. In some embodiments, the thermomechanical actuator can include a plurality of layers of the substrate, with at least one layer of the plurality of layers having a different coefficient of thermal expansion than another layer of the plurality of layers. For example, a first layer of the plurality of layers can include a silicon layer, a second layer can include an $SiO_2$ layer, and a third layer can include a metal heater layer. A thickness of at least one of the first, second, and third layers can be different that a thickness of another of the first, second, and third layers. In some instances, a thickness of each of the first, second, and third layers can be different. A thickness of the thin coating can be substantially uniform across a surface area of the substrate. In some embodiments a thickness of the thin coating can be approximately in the range of about 0.1 micrometers to about 10 micrometers.

In some embodiments, the thin coating can be configured to have a negligible impact, or no impact, on each of the mass of the active probe, the residual stress of the cantilever, and the stiffness of the active probe (meaning each parameter has either a negligible impact, or no impact). The thin coating can be configured to be chemically inactive in an opaque liquid environment. Some non-limiting examples of such environments include a crude oil, whole blood, and sulfuric acid. The thin coating can cover an entirety of the piezoresistive stress sensor. In some embodiments, the thin coating includes parylene, in some embodiments the thin coating includes a vapor deposition material, and still in some other embodiments, the coating can include atomic layer deposition. One non-limiting material that can included as part of the thin coating is a photoresist identifiable as "Positiv 20" (manufactured by Kontakt Chemie of Zele, Belgium; a technical data sheet is available at https://www.tme.eu/Document/b7a16ed14d2aa6149ed9a14fb-1b03d/TKC3%20POSITIV20.DTE.PDF, the contents of which is incorporated by reference herein in its entirety).

The piezoresistive stress sensor can include one or more piezoresistors. One or more of such piezoresistors can be disposed at one or more high stress locations for bending of the cantilever. In some embodiments, a plurality of piezoresistors of the piezoresistive stress sensor can be disposed in a Wheatstone bridge configuration, such configuration diminishing an effect temperature drift and/or crosstalk. A linear relationship can exist between a voltage across the piezoresistive stress sensor and deflection of the cantilever.

The probe can be configured to perform topography imaging. In some such embodiments, the topography imaging can be performed without either of a light source or an optical system. In at least some embodiments, the probe can be configured to operate in an opaque environment. Some no-limiting examples of such environments includes a crude oil, whole blood, and sulfuric acid.

The active probes provided for in the present disclosure can be included as part of a scanning electron microscope. In some embodiments, a system can be formed from a plurality of active probes, such probes being the probes of the present disclosure. The plurality of probes can be configured in an array for simultaneous imaging of a large area.

In one exemplary method for performing topography imaging, the method includes disposing an active cantilever probe into an opaque liquid environment and performing topography imaging with the active cantilever probe. The performance of topography imaging occurs without either of a light source or an optical system.

The opaque liquid environment can include at least one of a crude oil, whole blood, and sulfuric acid. The opaque liquid environment can include a harsh chemical environment.

During the action of performing topography imaging, a frequency measured by the active cantilever probe can be adjusted, for instance to account for moving the active cantilever probe from an outside environment (e.g., air) to the opaque liquid environment. In some embodiments, this adjustment can be achieved by performing a plurality of frequency sweeps. In some embodiments, this adjustment can be achieved by operating a second mode of a resonance frequency.

In some embodiments, the active cantilever probe may not initially be coated, or if coated, a further thin coating may be desirable. In such instances, the method can include forming a thin coating on the active probe. For example, forming a thin coating can include dip coating the active probe to form the thin coating on the probe. A person skilled in the art will recognize other ways by which a thin coating can be applied to a probe in view of the present disclosures.

A thin coating of the active probe can be thermally conductive, can have a low thermal resistance, and can be configured to have a negligible impact, or no impact, on at least one of a mass of the active probe, a residual stress of the active probe, or a stiffness of the active probe. A thickness of the coating can be substantially uniform across a surface area of a top surface of the active probe. In some embodiments, a thickness of the thin coating can be approximately in the range of about 0.1 micrometers to about 10 micrometers. In some embodiments, the thin coating can be configured to have a negligible impact, or no impact, on each of the mass of the active probe, the residual stress of the cantilever, and the stiffness of the active probe (meaning each parameter has either a negligible impact, or no impact). The thin coating can be configured to be chemically inactive in the opaque liquid environment.

BRIEF DESCRIPTION OF DRAWINGS

This disclosure will be more fully understood from the following detailed description taken in conjunction with the accompanying drawings, in which.

DETAILED DESCRIPTION

Figure 1A:
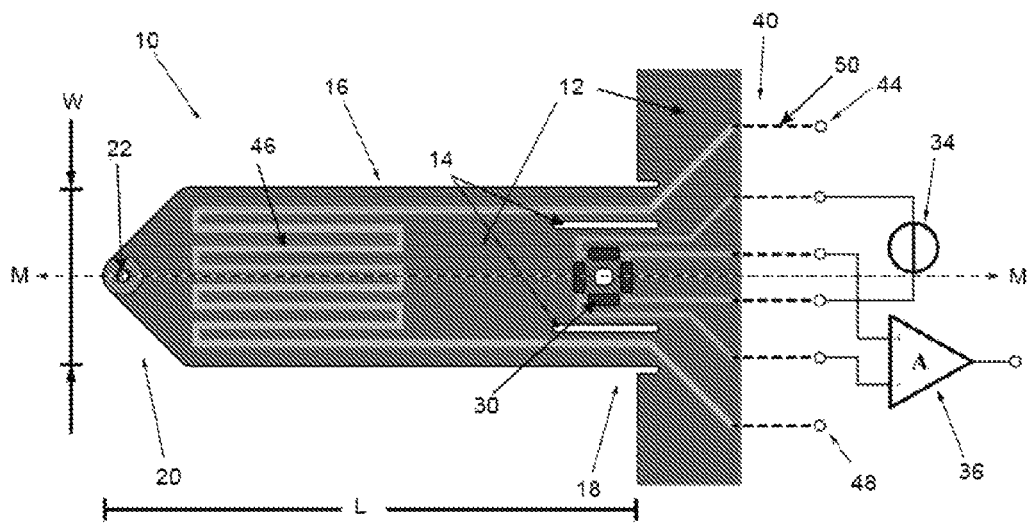
FIG. 1A is a schematic illustration of one exemplary embodiment of an active probe with thermomechanical actuation and piezoresistive sensing.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent the present disclosure includes various terms for components and/or processes of the disclosed devices, systems, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, one technique provided for coating an active cantilever probe is dip coating. A person skilled in the art, however, in view of the present disclosures will understand other ways by which a coating can be disposed on or otherwise associated with probes of the nature provided for herein or otherwise derivable from the present disclosures. In the present disclosure, like-numbered components of various embodiments generally have similar features when those components are of a similar nature and/or serve a similar purpose. To the extent terms such as front, back, top, bottom, tip, base, proximal, distal, etc. are used to describe a location of various components of the various disclosures, such usage is by no means limiting, and is often used for convenience when describing various possible configurations.

Cantilever probes, and more particularly active scanning cantilever probes, are the primary focus of the present disclosure. Cantilever probes are used in imaging and analysis techniques such as topography imaging. The probes provided for herein are constructed in a manner that allows them to be used in liquid environments, including those that are opaque and/or are chemically harsh (e.g., environments that have high acidity, such as 35% sulfuric acid), without having to use any light sources—including lasers—and/or optical systems to aid in the imaging. Further, the design of the probes herein is such that they can be used in very small-scale imaging environments, including for nano-scale topography imaging. Because the probes can operate in harsh and/or opaque environments, they allow for sample observations in locations that were previously not feasible because such observations would have required the use of other components to provide light and/or optics to make useful observations and such additional components was not practical or possible based on the size of the environment being measured or other factors impacting the use of probes.

One key to the cantilever probe designs provided for herein is a coating that is applied to the surface of the probe to protect the components of the probe. These components can include, but are not limited to, a substrate, a thermomechanical actuator, and a piezoresistive stress sensor, which can sense by deflection. The coating, which can be made from a photoresist polymer, can be thin (e.g., approximately in the range of about 0.01 micrometers to about 10 micrometers), can be uniformly applied across an entire surface of the probe, and can strongly bind to the probe, such as to the substrate of the probe. The coating can be applied in a manner that has little to no impact on any and all of the thickness of the probe, a mass of the probe, a residual stress of the cantilever of the probe, and/or a stiffness of the probe.

As described herein, the present disclosure provides for an active probe that is used to perform nano-scale topography imaging in opaque and/or harsh liquid environments. An active probe is different from a passive probe, although at least some of the teachings provided for herein can be applied to passive probes without departing from the spirit of the present disclosure. For example, a passive probe can be coated in a similar fashion as provided for in the present disclosure, although the benefits of doing so may not be as pronounced as they are for an active probe.

Passive probes can include a cantilever (sometimes referred to as a cantilever beam), often with a sharp tip, an external optical read-out, and an external excitation source for tapping mode operation. In some instances, the tip can also include a reflective back coating, among other features. Active probes also exist. Active probes typically utilize nanofabrication techniques to embed deflection sensing and resonance excitation elements into the cantilever probe. By doing so, the requirement of optical beam deflection amplification system and external excitation structure can be removed, which can be beneficial in many application scenarios.

Active probes provided for in the present disclosure include a bimorph cantilever structure, a piezo-resistive read-out (also described herein as a piezoresistive stress sensor(s) and/or piezoresistors), and a thermomechanical excitation for tapping (also described herein as a thermomechanical actuator). The biomorph cantilever structure can include multiple layers, at least some of which can have different coefficients of thermal expansion, which helps create the deflection measured by the piezo-resistive read-out. When compared to passive probes, components such as the piezo-resistive read-outs and thermomechanical excitation provide built-in structures that replace the external optical read-out and external excitation sources of the passive probes, to the extent such external components of the passive probe can be considered components of the passive probe (i.e., because they are external, they are often not considered to be components of a passive probe). Further, because of their structure, the provided for active probes also rely upon a demodulation strategy that is different from passive probes in tapping.

Design and Fabrication of Active Probes

Active Force Microscope (AFM) probes come in a variety of configurations and designs, and are fabricated in a variety of methods. Because the focus of the present disclosure is on a coating applied to a fabricated probe, the design and fabrication prior to applying a coating to the probe is of less importance; most any probe design, and method of creating that design, can be used in conjunction with the disclosed coatings and coating techniques. By way of non-limiting example, conventional AFM probes can be etched from silicon wafers.

Figure 1B:
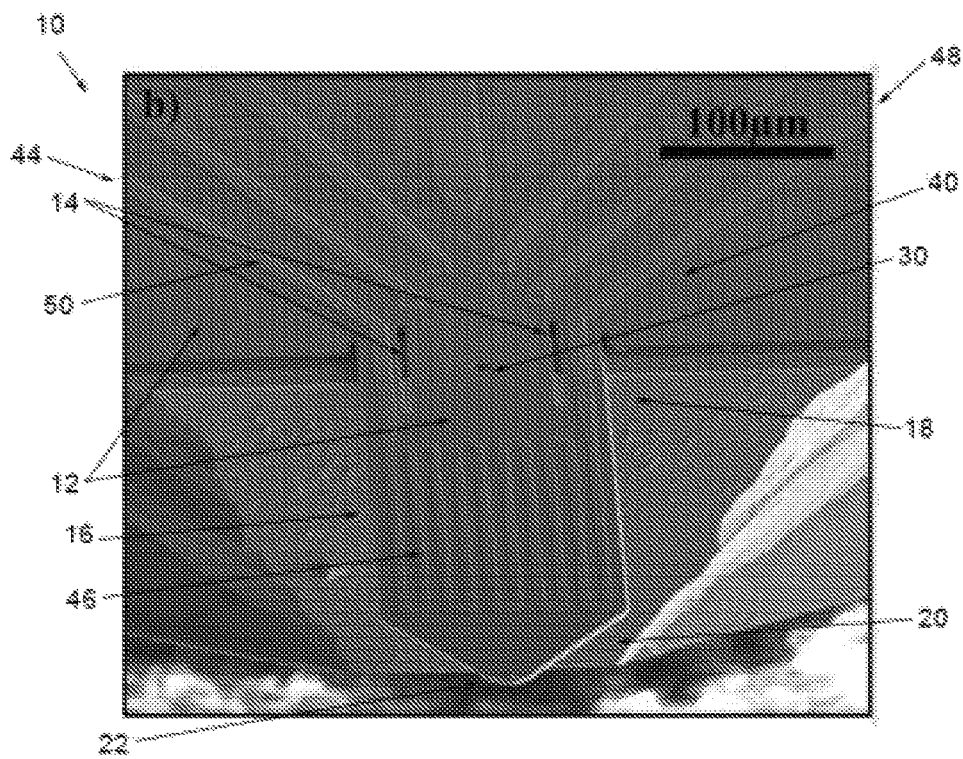
FIG. 1B is an SEM image top view of the active probe prior to having a coating applied thereto.

FIGS. 1A and 1B illustrate one example of an AFM cantilever probe 10. The probe 10 includes a substrate 12 on which various components of the probe 10 are disposed on or are otherwise formed on/in. The substrate 12 can be made of a variety of materials, including but not limited to silicon, such as n-type silicon. A material like n-type silicon can allow for components of the probe 10 to be etched into or onto the substrate 12. In the illustrated embodiment, one or more holes or channels 14 can be formed in the substrate 12 itself, which can increase stress in the substrate 12, thus enhancing the ability to measure changes in stress. As shown, the holes 14 are opposed from each other on opposite sides of a midline M of the substrate 12, substantially equidistant from the midline M, although other, configurations are possible. The substrate 12 includes a cantilever or cantilever beam 16 having a base portion or region 18 and a tip portion or region 20, which as shown includes a tip 22. The cantilever 16 can be configured to deflect, for example in response to an actuation signal, and the resulting deflection can be measured. A person skilled in the art will recognize that different choices of material, sizing, and specialized probe tip treatment, among other features, can be designed for different applications. In addition to the cantilever 16, the illustrated embodiment includes two further major functional subsystems embedded into the active probe: 1) a piezoresistive stress sensor 30 for probe deflection measurement; and 2) a thermomechanical actuator 40.

One or more sensors 30 can be included to measure deflection of the cantilever 16, such as measuring deflection at the tip region 20. In the illustrated embodiment, a plurality of p-doped piezoresistors 30 (as shown, four) are placed at high stress locations for bending, as shown proximate to or at the base region 18. Electrical circuitry components 32 that help measure the signals from the piezoresistors 30 are also provided. As shown, these include a bridge supply 34 (e.g., a Wheatstone bridge configuration) and an amplifier 36 that outputs a deflection signal. More generally these components can be referred to as preamp electronics. A person skilled in the art will recognize that other circuitry configurations and features are possible without departing from the spirit of the present disclosure.

In the case of a multi-layer cantilever, the displacement can be related to the stress between layers of maximum thermal expansion coefficient difference. The mechanical stress results in a specific resistance change that can be measured as a voltage signal if the piezoresistor 30 is biased at a fixed current. By doing so, a linear relationship can be derived between the voltage across the piezoresistor 30 and deflection of the cantilever 16. However, the presence of parasitic effects and temperature drifts can introduce noise and compromise the signal integrity especially when thermomechanical actuation is utilized. To resolve this issue, the integrated Wheatstone bridge configuration can be utilized to compensate for the temperature drift and crosstalk. Signal-to-noise ratio similar to optical-read-out technique can be achieved for the purpose of AFM imaging.

A variety of techniques can be used to cause the cantilever 16 to deflect. In the illustrated embodiment, thermomechanical actuation is utilized. Components of the actuator 40 include electrical circuitry 42, heating elements, and related components that cause the cantilever 16 to defect. As shown the electrical circuitry components include an actuation signal 44 that initiates heating of a heater 46, as shown an aluminum wire heater, and ground 48 to complete the circuit. Bond wires and carrier printed circuit board (PCB) traces 50 can be used to transfer the actuation signal from a carrier PCB or the like to the heater 46. In the illustrated embodiment, thermomechanical actuation is achieved by resistive heating of the cantilever 16 formed by multiple layers with different coefficients of thermal expansion. In one non-limiting embodiment, a 6 µm thick silicon layer, a 0.35 µm thick SiO$_2$ layer, and a 0.7 µm thick metal heater layer are combined. A person skilled in the art will recognize many different multiple layer configurations that can be formed, using a variety of different materials and/or a variety of different thicknesses. While some embodiments of a multi-layered actuator can include layers with different thicknesses, including instances where each layer of a multi-layer actuator has different thicknesses, in other embodiments, multiple layers of a multi-layered actuator can have similar or equal thicknesses. As only heating and energy dissipation into the surrounding environment is available (no cooling), unidirectional bending of the cantilever probe 10 can be achieved. A linear relationship between temperature rise and deflection of the cantilever tip 22 can be derived. For driving the probe 10, the situation can be more complicated as the temperature is proportional to the power, which is related to the square of the supplied voltage. This non-linearity can be accounted for with a custom lock-in amplifier (see FIG. 6C), which is discussed below.

The active cantilever probe 10 can be small, thus allowing it to be used as a nano-scale topography imaging tool. The active cantilever probe 10 is typically longer than it is wide to provide for better deflection to be measured. As shown, a length L of the probe 10 is more than twice its width W, although other ratios are possible. For example, in some non-limiting embodiments a length L of the probe 10 can be approximately in the range of about 100 µm to about 1000 µm, and a width W of the probe 10 can be approximately in the range of about 50 µm to about 500 µm, and in one such embodiment the length L is approximately 300 µm and the width W is approximately 125 µm.

Fabrication of the cantilever probe 10 can involve multiple lithography steps on the substrate 12 (e.g., an n-type silicon substrate). The tip 22 of the probe 10 can be formed first and then the piezoresistor deflection sensing element 30 can be formed with boron diffusion. After that, the heating element (e.g., the heater 46) can be formed, for example by metal etching of an aluminum deposition layer masked with photoresist. Other types of alloys, such as Cu/Au/Ta alloy with high expansion coefficient, can also be utilized. Likewise, other types of heating elements can be utilized, and a person skilled in the art will appreciate that heating in conjunction with the present disclosure can be realized with resistive dissipation of electrical power when current flows through a resistor. Further, the resistive heating element geometry can be changed while the arrangement can be optimized for the corresponding geometry of the cantilever, depending on the design, without departing from the spirit of the present disclosure. A bonding process can attach the cantilever probe 10 onto an SD card shaped PCB for electrical contact and easy probe exchange. A detailed step-by-step illustration of the cantilever fabrication process can be found in a publication entitled "Thermally driven micromechanical beam with piezoresistive deflection readout," published in *Microelectronic Engineering* by T. Ivanov, et al., in 2003, at pages 67-68 and 550-556, from the proceedings of the 28$^{th}$ International Conference on Micro- and Nano-Engineering, the contents of which is incorporated herein by reference in its entirety.

Coating of Active Probe

An uncoated active probe is suitable for operation in ambient and vacuum environments. For operation in liquid environments, it is necessary to protect the probe with coatings for electric insulation and resistance to corrosive chemicals. The coating should satisfy several requirements to insure it does not compromise the functionality of any subsystem of the active probe. These requirements, all of which are achieved by the present disclosure but not, at least in total, by probes that existed prior to the present disclosure, include:

1. Bond well to a surface material of a cantilever probe (Silicon, SiO$_2$, Heating metal, etc.);
2. Be thermally conductive with low thermal resistance to allow heat dissipation into the environment for thermomechanical actuation;
3. Form a thin uniform layer of coating without significantly affecting the mechanical property of the probe (e.g., small additional mass, low residual stress, small increase of overall bending stiffness or damping, etc.); and
4. Be chemically inactive for selected environments depending on the application (e.g., crude oil, whole blood, sulfuric acid, etc.).

While a person skilled in the art will recognize a variety of different techniques that can be used to apply a coating to an active probe, due to the delicate nature of the active cantilever probe and complication in redesigning the manufacturing process, dip coating can be a useful technique. In conjunction with arriving at preferred coatings for use in conjunction with the present disclosures, various types of polymers were tried including M-Bond 610, UHU all-purpose adhesive, 2K.-Epoxy, M-Bond 43B, and photoresist polymers for photolithography. The coating that proved to be the most effective is a photoresist identifiable as "Positiv 20" (manufactured by Kontakt Chemie of Zele, Belgium; a technical data sheet is available at https://www.tme.eu/Document/b7a6a16ed14d2aa6149ed9a14fb1b03d/TKC3%20POSITIV20.DTE.PDF, the contents of which is incorporated by reference herein in its entirety). Most of the other tested materials proved to be not as desirable because they suffered from one or more of the following deficiencies: poor bonding, thick coating layers, inability to withstand corrosive chemicals, and/or failure to maintain a usable resonance peak for the probe.

Figure 2A:
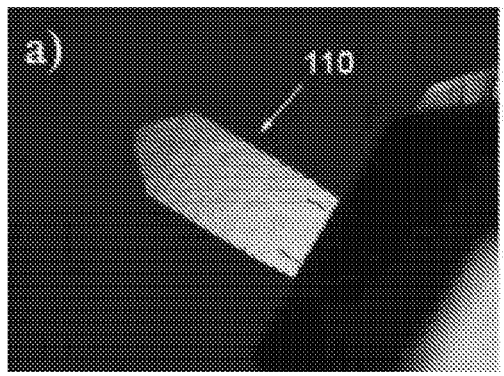
FIG. 2A is an optical microscopy image top view of another exemplary embodiment of an active probe, the probe having an uncoated silicon surface.
Figure 2B:
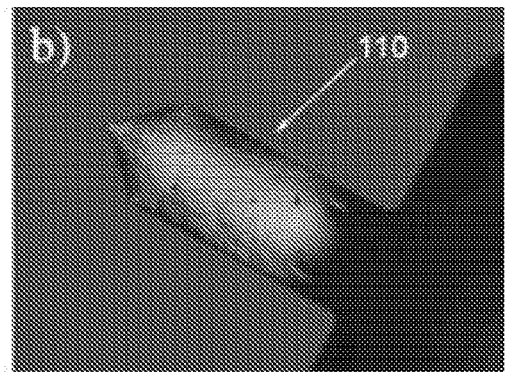
FIG. 2B is an optical microscopy image top view of the active probe of FIG. 2A with a coated silicon surface.
Figure 2C:
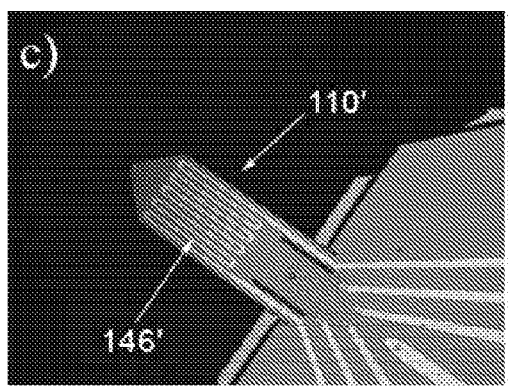
FIG. 2C is an optical microscopy image top view of yet another exemplary embodiment of an active probe, the probe including heating wires and having an uncoated surface.
Figure 2D:
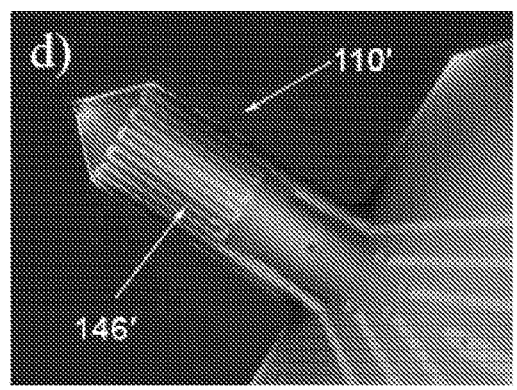
FIG. 2D is an optical microscopy image top view of the active probe of FIG. 2C with a coated surface.

Before the coating of the micro-electromechanical systems (MEMS) cantilever, the bond wires 50 connecting the silicon chip or substrate 12 with the carrier PCB were protected using techniques known to those skilled in the art. For example, a viscous two-compound epoxy glue EPO-TEK H70E, which itself is not suitable to coat the actual cantilever beam 16, can be used to protect the bond wires 50. The epoxy can be cured at approximately 100° C. for about two (2) hours, although other temperatures and lengths of time are possible. The probes 10 can then be coated using the photoresist "Positiv 20." Positiv 20 is primarily intended to be used as a photoresist for masking printed circuit boards. According to the datasheet, which is referenced above and incorporated herein by reference, it is able to withstand strong etchants, such as hydrofluoric acid (40%), nitric acid (65%), and iron(III) chloride. Furthermore, it has a suitable viscosity to cover a silicon microstructure like an AFM cantilever with a resist layer of only a few µm thickness. Because this particular resist is sold in spray cans only, in one exemplary embodiment the aerosol was first sprayed into a disposable aluminum pan until a sufficient amount of resist had accumulated. Then the cantilever 16 was immersed in the liquid, making sure that the resist covered all the parts of the silicon chip or substrate 12 that had not been covered previously by the two-compound epoxy. Subsequently, the cantilevers 16 can be placed on a hot plate having a temperature of approximately 70° C. for about 15 minutes in a dark environment to dry the resist. This controlled environment (i.e., directly in ambient air), helps prevent poor adhesion and limits the possibility of dust entrapment and pinholes. Afterwards, the cantilevers 16 can be exposed to ultraviolet light for about five (5) minutes. Finally, the coated cantilevers can be immersed into a sodium hydroxide solution (e.g., 7 g/1 L) to develop the resist. The various steps in this process allow the coating to bond to the substrate. Optical microscopy images as shown in FIGS. 2A-2D can be used as a preliminary step to verify the success of the coating application being bonded to the substrate, with FIG. 2A illustrating a probe 110 having an uncoated silicon surface, FIG. 2B illustrating the probe 110 having a coated silicon surface, FIG. 2C illustrating a probe 110' having an uncoated surface with heating wires 146', and FIG. 2D illustrating the probe 110' having a coated surface with heating wires 146'. A person skilled in the art will recognize that other times and temperatures may be used to bond the coating to the substrate 12 without departing from the spirit of the present disclosure.

In the present disclosure, by incorporating features like a piezo-resistive read-out and a thermomechanical excitation for tapping, and then protecting one or both from an environment in which they are disposed (e.g., chemically harsh environment) by way of a coating, the active probes can be used for topography imaging in many different environments not previously possible without a light source or optical systems (e.g., external laser optics), such as an opaque environment. The coating protects against corrosion, the attachment of undesirable particles onto the probe, among other benefits. As a result, active probes with coatings as provided for herein allow for the exploration of new types of environments, including those in their native form without being altered (e.g., whole blood, crude oil).

Coating a device such as an active cantilever probe is a rather difficult task because of the number of parameters that can impact the performance of the probe, particularly because the probe is so small, i.e., in the micrometer or nanometer range. Typically, an entire probe is coated, with the probe having a width approximately in the range of about 50 microns to about 150 microns (in some instances, about 100 microns), a length approximately in the range of about 300 microns to about 500 microns, and a thickness of several microns (e.g., approximately in the range of about 5 microns to 20 microns). In other instances, only a portion of a surface area of a probe may be coated though. Regardless, given the small size of the probe, a coating of any thickness can be comparably large to the dimensions of the probe, whereas a coating applied to a larger object is minimal by comparison to the dimensions of the larger object. Further, other features of a probe may make it difficult to coat them. For example, as described above, an active probe that utilizes a tuning for structure for vibration excitation and measurement has multiple oscillators, which can make it difficult to coat while maintaining suitable performance. The various parameters that may impact the performance of the probe must be accounted for when providing a coating on such small-scale devices, and thus it is not merely a matter of providing a coating on a component.

Accordingly, when coating active cantilever beams as provided for herein, the following properties (also identified earlier) play an important role in the feasibility and operability of the resulting coated active probe.

First, the coating should bond well to a surface material(s) of the cantilever probe. The material(s) to which the coating is bonding may include silicon, silicon nitride, a heating metal, among other materials and components.

Second, the coating should be thermally conductive and have low thermal resistance. This can allow for efficient heat dissipation into the environment for thermomechanical actuation. Because the biomorph structure of the present disclosure bands in one direction when heated and returns to its original state when cooled to the ambient temperature, the resulting thermal conductivity provides heat dissipation that is sufficiently fast into the environment so that the probe can oscillate at resonance for tapping mode AFM imaging. It can be difficult to directly measure the thermal conductivity of the coating on the cantilever, particularly when such small geometric dimensions are used (e.g., a micro-cantilever), but a frequency response can be tested and verified to confirm enough thermal conductivity. For example, rather than directly measuring thermal conductivity, which may also be an option, the frequency response of the cantilever before and after coating is applied can be tested. Provided that a resonance peak can still be observed, the functionality has been preserved and the probe can be used as desired.

Further, at least because conductance is the inverse of resistance, thermal conductivity and thermal resistance are, in a sense, equivalent. The impact of the coating on thermal conductivity and thermal resistance can be quantified by a thermal time constant $\tau$. The thermal time constant $\tau$ is defined as:

$$\tau = \frac{\rho c_p V}{h A_s}$$

in which $\rho$ is density, $c_p$ is specific heat, V is body volume, h is the heat transfer coefficient, and $A_s$ is the surface area. The time constant is such that larger masses (e.g., $\rho V$) and larger heat capacities (e.g., $c_p$) lead to slower changes in temperature, while larger surface areas (e.g., $A_s$) and better heat transfer (e.g., h) lead to faster temperature changes.

As provided for by the present disclosure, the cantilever resonance frequency $f$ (tens of kilohertz) can be sufficiently excited. Typically the first resonance frequency can be within a bandwidth of a first order thermal system of the cantilever. This can be the equivalent of making sure that the thermal time constant $\tau$ is smaller than $1/f$ (tens of microseconds).

Third, the coating should form a substantially thin, substantially uniform layer on the surface material(s). Generally, the thinner and more uniform the coating can be, the less it will have any significant impact on the mechanical properties of the probe. The coating should, ideally, have no, or at most a negligible, impact on one or more of a mass of the probe, a residual stress of the cantilever (or the probe more generally), and/or a stiffness (or damping) of the probe, among other properties. For example, when a thickness of the coating is approximately in the range of about 6 micrometers to about 8 micrometers in a flat area of the cantilever, a small thickness can be expected at areas with sharp geometry, such as the cantilever probe tip. Such a configuration can be desirable to help reserve spatial resolution of the probe. If the thickness is too great, a person skilled in the art will understand when the mass and/or stiffness are too adversely impacted to allow the probe to function as it is intended to function. That is, if the coating is too thick, the cantilever frequency response would have very small resonance behavior, sometimes even so much so that it cannot even be observed as a gain peak. The increased mass and stiffness due to a coating that is too thick would typically render the probe useless for imaging. The coating procedures provided for herein were determined in view of multiple experiments to determine the aspects of the coating the best preserve the functionality of the cantilever for AFM imaging. It is evident at least from the frequency sweep in FIGS. 3A and 3B that the coating changes the frequency response of the cantilever, and a person skilled in the art, in view of the present disclosures, can verify that such thickness has a "negligible impact" without undue experimentation based, for example, on the imaging capability of the cantilever probe transducer being preserved.

More generally, in some exemplary embodiments, a thickness of the coating is approximately in the range of about 0.1 micrometers to about 10 micrometers, although other thicknesses are possible depending, at least in part, on the dimensions and configurations of the probe being coated and the environment in which the probe is being used. Further, in some embodiments, a uniformity of the coating is such that a thickness of the coating at one location on the same approximately flat surface (i.e., the substrate as opposed to the location of the tip) is approximately no more than about ±10% thicker or less thick that at another location on the same surface. Such a configuration is considered to be substantially uniform. It may be desirable, in some instances, for the coating to be thinner at some locations, such as the probe tip, to maintain the probe sharpness while still being able to protect the probe itself. Accordingly, the uniformity determination is not typically based on the entire probe, but on like surfaces of the probe. Further, the coating may be a bit thicker in some areas across a flat surface because of phenomena such as surface tension. For example, a coating may be thicker in a middle section of the cantilever because of the surface tension of the coating (e.g., a liquid polymer) prior to hardening the coating (e.g., using a UV-light).

Fourth, the coating should be chemically inactive for selected environments. Depending on the application, chemical inactivity for a probe coating can mean that there is no reaction with the environment during imaging. More generally, chemical inactivity can be quantified by controlling temperature, changing the exposed agent, and measuring the exposure time before damage.

As provided for herein, one material that can be used to provide the thin coating is a photoresist identifiable as "Positiv 20". Positiv 20 resists strong acidic etching products, but can be easily removed by solvents (e.g., ester, ketone) or aqueous alkalines. Accordingly, if the environment in which the active probe is operated includes solvents or aqueous alkalines that can easily remove the thin coating, a different thin coating that is resistant to such solvents or aqueous alkalines should be used. Whether the thin coating is chemically inactive will depend, for example, at least on the application in which it is being used (i.e., the environment in which it is being used). Some non-limiting examples provided for herein include use in crude oil, whole blood, and sulfuric acid. A person skilled in the art, in view of the present disclosures, will understand how to identify suitable materials for use as a thin coating depending, at least in part, on the environment in which the probe and thin coating is to be used and the geometry, configuration, and other properties of the probe and/or the environment.

Active Probe Mechanical Property Characterization

Figure 3A:
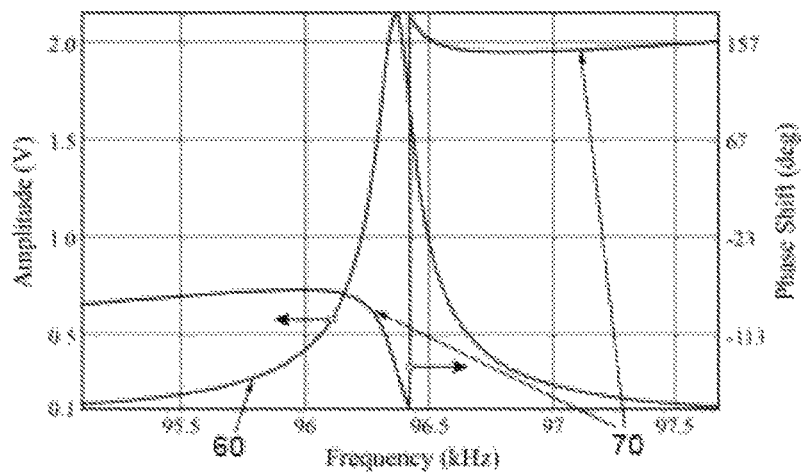
FIG. 3A is a graph illustrating frequency sweep results for one exemplary embodiment of a cantilever probe before applying a coating to the probe.
Figure 3B:
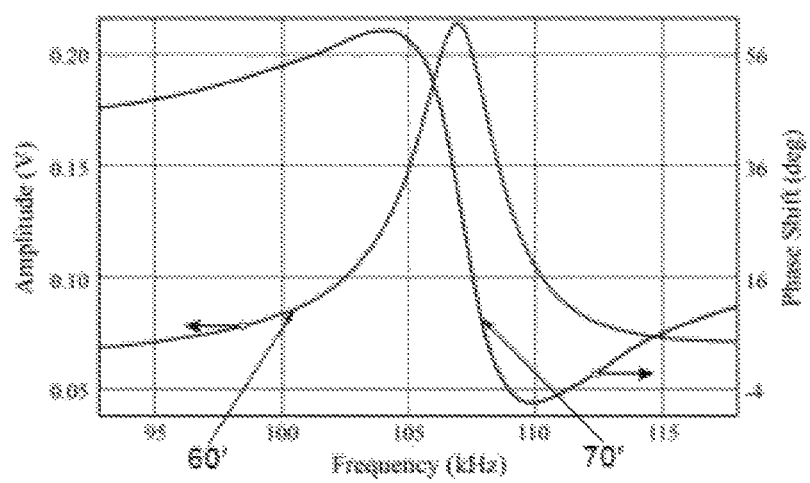
FIG. 3B is a graph illustrating frequency sweep results for the cantilever probe of FIG. 3A after applying a coating to the probe.

To better understand the effect of coating, frequency response experiments were conducted for the cantilever probes before and after coating. The results are shown in FIGS. 3A and 3B. More particularly, FIG. 3A illustrates frequency sweep results with amplitude 60 and phase 70 for one cantilever probe 110 before coating with resonance frequency at approximately 96.365 kHz and maximum output amplitude at approximately 2.06047 V, while FIG. 3B illustrates frequency sweep results with amplitude 60' and phase 70' for the same cantilever probe 110' after coating with resonance frequency at approximately 106.564 kHz and maximum output amplitude at approximately 0.201769 V (oscillation amplitudes in unit of volts are recorded instead of gains from the data acquisition system with the same driving signals applied during the sweep for comparison.)

After the coating application, the overall mass of the probe 110' increases, which should in principle reduce the resonance frequency of the probe 110'. However, all probes after coating demonstrated an increase in the first mode resonance frequency. This indicates the coating increases the stiffness of the cantilever probe, which results in an overall increase of resonance frequency. The oscillation amplitude of the probe 110' also decreased to be almost an order of magnitude smaller than the original uncoated probe 110 with identical driving signals. This can partly be attributed to the increase of probe 110' stiffness. Another possible reason is that the coating increases the thermal capacitance and resistance of the probe 110' such that the temperature variation amplitude is decreased. This results in a smaller probe deflection that is measured from the frequency sweep. The decrease of oscillation gain amplitude can partly be compensated by increasing the driving signal but may result in a reduced operation lifetime of the probe 110' due to extensive heating and increased internal stress.

A key to enable opaque liquid environment imaging is a coated active probe. The design and manufacturing of an active probe with nano-fabrication technology is an intricate process that requires significant investment of time, capital, and effort. At such cost, the developed active probes offer a number of benefits. First, the removal of the on-board diagnostics (OBD) system for deflection sensing enables easy exchange of probes without the need of laser alignment and reduces the size of the system. At such a size an AFM can even be integrated into a Scanning Electron Microscope (SEM) system. Accordingly, an SEM can include the various embodiments of an active probe(s) made possible by the present disclosures. Second, multiple active probes can be fabricated to form an array for simultaneous imaging of a large area. Third, the ability to fabricate and embed electronics into the cantilever probe itself allows various functionalized probes to be developed as a toolkit for specific applications. A more detailed discussion of the benefits, limitations, and applications of active probes can be found in a review article entitled "Active scanning probes: A versatile toolkit for fast imaging and emerging nanofabrication," published in the *Journal of Vacuum Science & Technology B* by I. W. Rangelow, et al., in 2017, page 35 (06G101), the contents of which is incorporated herein by reference in its entirety.

Alternative Illustrations of Active Cantilever Probes Having Coatings

Figure 4:
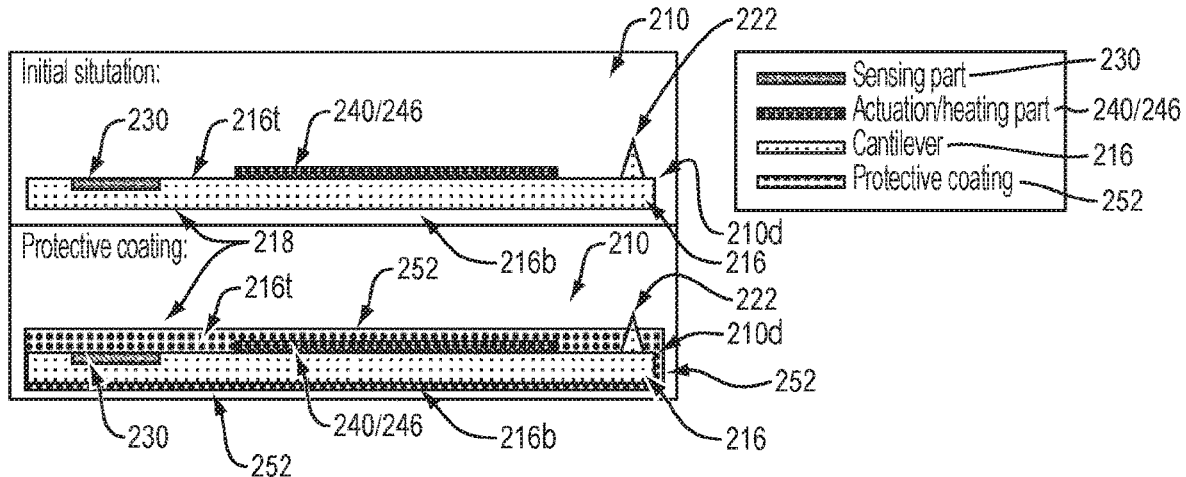
FIG. 4 is a schematic illustration of another exemplary embodiment of an active probe.

FIG. 4 provides for a schematic illustration of one exemplary embodiment of an active cantilever probe 210. The probe 210 includes a sensing part 230 (e.g., a piezoresistive stress sensor) proximate to or at a base portion 218, and an actuation/heating part 240/246 (e.g., a thermomechanical actuator) distal of the sensing part 230, disposed between the sensing part 230 and a distal tip 222 (illustrated by a triangular shape, although other shapes are possible) projecting away from a top surface area 216*t* of the probe 210. Thus, the actuation/heating part 240/246 can also be disposed between the sensing part 230 and a distal terminal end 210*d* of the probe 210, the distal terminal end 210*d* being at a location at which a surface connects the top and bottom surfaces 216*t*, 216*b* of a cantilever 216. As shown, a protective coating 252 can be disposed on the cantilever 216, the coating 252 having a substantially uniform thickness across an entire top surface area and bottom surface area of the cantilever 216. As further shown, the thickness of the coating 252 for the top and bottom surfaces 216t, 216b does not need to be the same, although it can be. In the illustrated embodiment, an entirety of the distal tip 222 projecting away from the top surface area 216t is not entirely covered by the coating 252. In other instances, the projecting distal tip 222 can be entirely covered by a coating, though such a configuration may negatively impact the performance of the cantilever 216, for instance by reducing the sharpness of the probe tip 222, thereby reducing the resolution of contact mode imaging (the impact is not typically significant for tapping mode imaging). The coating 252 can also extend over the distal terminal end 210d of the cantilever 216 as shown (i.e., covering the surface that connects the top and bottom surfaces 216t, 216b of the cantilever 216), with again the thickness optionally be the same or different than the thicknesses of the coating 252 for the top and bottom surface areas. In other embodiments, a coating may not cover a surface that connects the top and bottom surfaces 216t, 216b of the cantilever 216, for example because the surface tension in combination with a small thickness of the cantilever 216 (e.g., approximately in the range of about 5 micrometers to about 10 micrometers).

Figure 5:
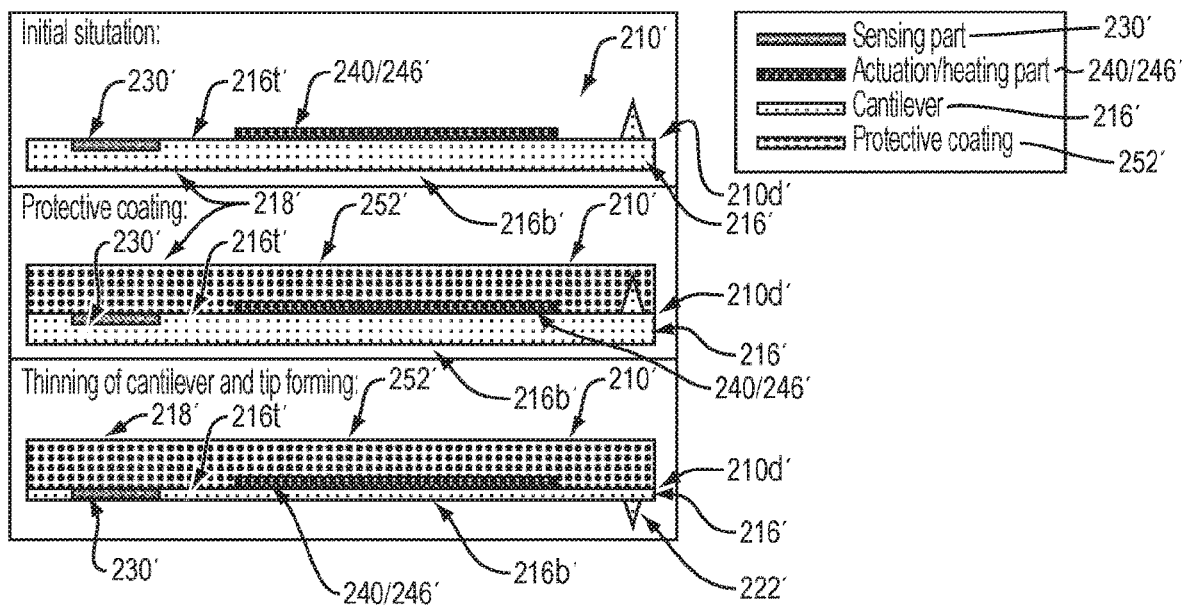
FIG. 5 is a schematic illustration of yet another exemplary embodiment of an active probe.

FIG. 5 provides for a schematic illustration of an alternative exemplary embodiment of an active cantilever probe 210'. Similar to FIG. 4, the probe 210' includes a sensing part 230' (e.g., a piezoresistive stress sensor) proximate to a base portion 218', and an actuation/heating part 240'/246' (e.g., a thermomechanical actuator) distal of the sensing part 230', disposed between the sensing part 230' and a distal terminal end 210d' of the probe 210'. As shown, a protective coating 252' can be disposed on a cantilever 216', the coating 252' having a substantially uniform thickness across an entire top surface area of the cantilever 216'. As shown, the thickness of the coating 252' for a top surface 216t' is thicker than in FIG. 4, although in other instances it may be thinner or the same thickness. Further, a portion of the cantilever 216' can be thinned or otherwise removed. As shown, a bottom surface 216b' is thinned such that the new bottom surface 216' is substantially aligned with the sensing part 230'. Other configurations of the bottom surface 216b' are possible. A distal tip 222' (again illustrated as a triangle, although other shapes are possible) can be formed or otherwise disposed on the new bottom surface 216b' of the cantilever 216'. A coating (e.g., Si, SiN, etc.) may or may not be placed over all or part of the bottom surface 216b', the distal tip 222', and/or the terminal end 210d'. This formation can be beneficial because it can allow for an active sensing and actuating part on a polymer cantilever to be maintained.

AFM Imaging System Design

Figure 6B:
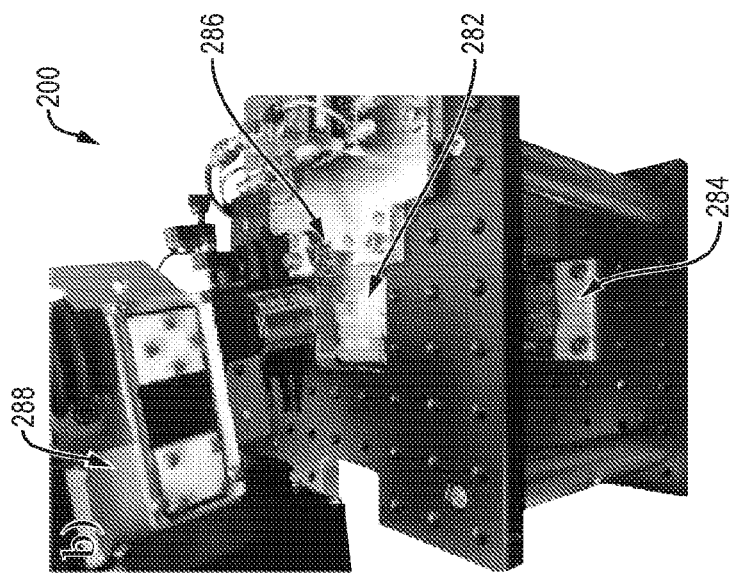
FIG. 6B is a detailed perspective view of the AFM set-up of FIG. 6A.
Figure 6A:
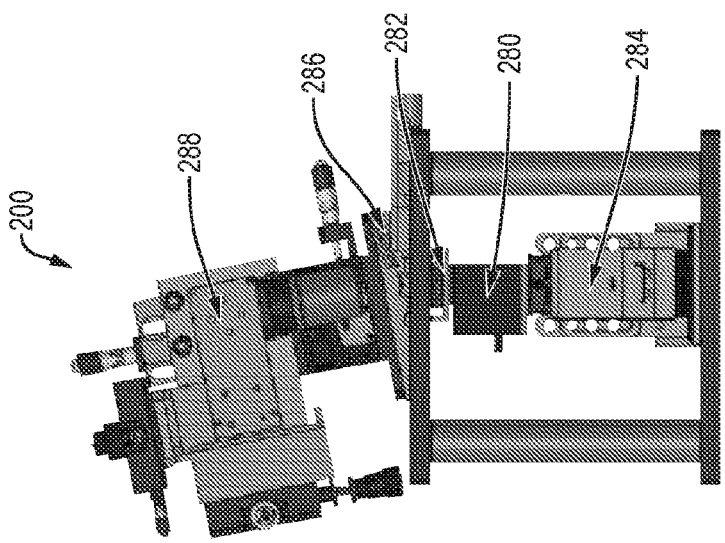
FIG. 6A is a side view of one exemplary embodiment of an Atomic Force Microscope (AFM) system set-up.

To evaluate the imaging performance of the coated active probes, a custom AFM system is designed. The set-up incorporates both active probe and OBD system passive probe imaging with a sample scan configuration. One exemplary embodiment of such a system 200 is illustrated in FIGS. 6A and 6B. As described below, a general introduction of the subsystems of the illustrated system 200 and a discussion of a field-programmable gate array (FPGA) demodulation implementation for active probe imaging is provided.

System Level Design

To cater to various types of demands, a 5-axis scanner with multi-actuation is designed. For large range overview of the sample, a large-range XYZ scanner 280, such as a P-611.XYZ from Physik Instrumente (PI), is utilized. The scanner 280 can operate in 3 orthogonal axes at about 100 mm positioning range with capacitive sensor feedback for high positioning accuracy with resonance frequency up to about 180 Hz. To allow high-speed scanning capability, a high-bandwidth scanner 282 for X and Z axis operations can be provided. For the high-speed Z axis, a PL022.31 piezo actuator from PI constrained by a flexure cap can be used to achieve bandwidth over 100 kHz with about 1 micron motion range. In the X-axis direction, 2 P-885.11 piezo actuators from PI can be utilized to form a dual push configuration. The sample stage is constrained via music wires on a set of 8 ball bearings, although other constraint systems can be utilized or otherwise designed. This configuration reduces the crosstalk between axes and minimizes the thermal drift of piezo actuators at high bandwidth. The X-axis has an approximately 10 kHz bandwidth with maximum of approximately 6.5 micron travel range. Although not being the focus of the this preliminary study on coated active probe performance, the high-speed scanner offers potential for dynamic phenomenon visualization with more details provided for in a publication entitled "Design and Control of a Multi-actuated High-bandwidth and Large-range Scanner for Atomic Force Microscopy," published in conjunction with the 2019 Annual American Control Conference (ACC) in 2018, at pages 4330-4335, the contents of which is incorporated herein by reference in its entirety. High-speed imaging using coated active probes would typically require contact mode operation with a coating material that maintains sharpness of the probe tip.

A high-precision engagement system 284 is constructed by combining a PK523HPA-H50S harmonic 210 drive stepper motor from Oriental Motor Corporation capable of approximately 25,000 steps per revolution with a DS40-XYZ positioner with approximately 80 revolution per inch accuracy. The combined setup has a theoretical 12.7 nanometer step size that allows precise control of the engagement process. An active probe holder 286 can include mounting structure(s) and signal conditioning circuitry. Active probes of the type described herein can be held within or otherwise by the active probe holder 286. An optical system 288 of the system 200 can utilize up to infinite corrected objective lens to allow optical microscope view and optical readout for passive probes. External drivers with piezo actuator hysteresis compensation capability to improve positioning accuracy without usage of feedback sensor can also be developed.

FPGA-Based High Throughput Digital Lock-in Amplifier

Due to the thermomechanical actuation of the active probes, the driving method is different from conventional tapping mode AFM imaging with passive probes. The relationship between the deflection of the probe and input voltage with DC and AC components is given in Equation (1).

$$U_p \propto \delta \propto T \propto P_{heat} = \frac{(V_{dc} + V_{ac}\sin(\omega t))^2}{R} = \frac{1}{R}\left(V_{dc}^2 + 2V_{dc}V_{ac}\sin(\omega t) + \frac{1}{2}V_{ac}^2(1 - \cos(2\omega t))\right) \quad (1)$$

where $U_p$ is the voltage signal from the piezoresistor readout, $\delta$ is the cantilever probe deflection, T is the temperature, $P_{heat}$ is the resistive heating power, R is the heater resistance, $V_{dc}$ is the DC component of the applied voltage, $V_{ac}$ is the magnitude of the AC component of the applied voltage, $\omega$ is the driving frequency in rad/s and t is time. The trigonometry identity $2\sin^2(\omega t)=1-\cos(2\omega t)$ is implicitly utilized in the derivation. From Equation (1), the output signal can be considered as having 1 DC component and 2 AC components at frequencies $\omega$ and $2\omega$. To improve the demodulation performance, it can be beneficial to eliminate one of the AC components. A straightforward method to achieve this is to set $V_{dc}=0$ such that the AC output of the power at the frequency of $2\omega$. This essentially means that the driving sinusoidal waveform frequency $\omega$ is at half of the selected operating frequency $\omega_{operate}$, slightly below the first resonance of the cantilever probe to have $\omega=\omega_{operate}/2$.

Figure 6C:
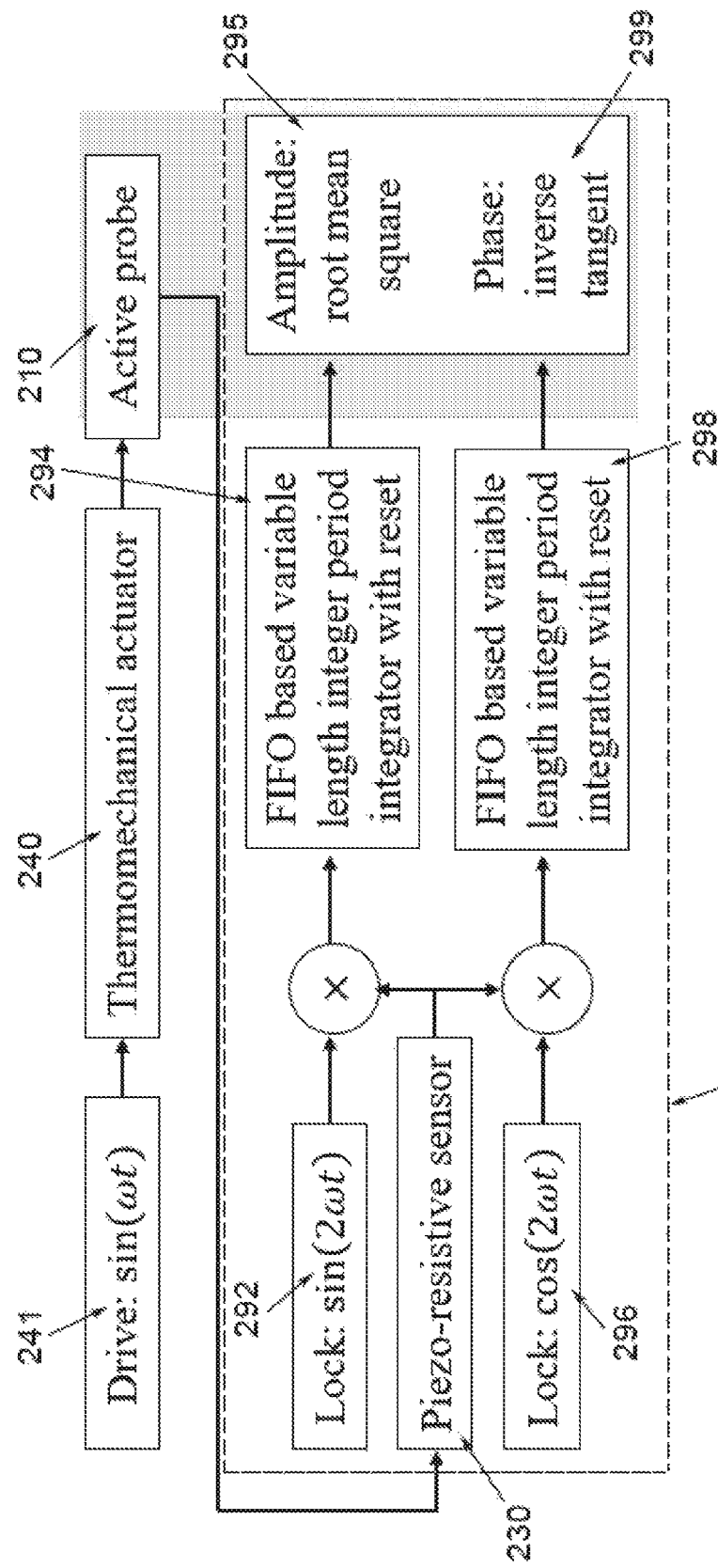
FIG. 6C is a block diagram of one exemplary embodiment of a field-programmable gate array (FPGA) based high throughput digital lock-in amplifier for use with active probe AFM operation.

To improve the demodulation speed, integration over integer number of periods can be preferred over long-time integration with low-pass filter. The oscillation amplitude can be extracted with only a few periods of the sinusoidal waveform. With proper implementation of a pipeline for integration, the digital lock-in amplifier can produce amplitude value at the same throughput rate as that of the data acquisition. It is also adjustable to a wide range of frequencies (mHz to MHz) with minimal added latency. FIG. 6C provides a block diagram overview of the design.

More particularly, as shown, a thermomechanical actuator 240 (e.g., the actuator 40) can be driven by a sinusoidal waveform sin($\omega$t) 241 to deflect an active probe 210 (e.g., the active probe 10). A piezoresistive sensor(s) 230 (e.g., the sensor(s) 30) can measure the deflection of the active probe 210. The sensor(s) 230 can communicate with an FPGA-based high throughput digital lock-in amplifier 290 to output results such as an amplitude 295 and a phase 299. As shown, the amplifier 290 includes a sin($2\omega$t) lock 292, a filter 294, a cos($2\omega$t) lock 296, and a filter 298. More particularly, the filter 294 illustrated in FIG. 6C is a first-in, first-out (FIFO)-based variable length integrator period integrator with reset filter, and can take the moving average of the product from the lock 292 and the sensor(s) 230. Likewise, the filter 298 illustrated in FIG. 6C is a FIFO-based variable length integer period integrator with reset filter, and can take the moving average of the product from the lock 296 and the sensor(s) 230. Other filters are possible without departing from the spirit of the present disclosure. An output, as shown an amplitude 295, can be produced by taking the root mean square of result from both the output of the filter 294 and the output of the filter 298, as in $Out_{295}=(Out_{294}^2+Out_{298}^2)^{1/2}$. Similarly, an output, as shown a phase 299, can be produced by taking the inverse tangent of the ratio of the output of the filter 294 and the output of the filter 298, as in $Out299=\tan^{-1}(Out294/Out298)$.

For implementation, in one exemplary embodiment, the lock-in amplifier 290 is provided for by NI LabVIEW on an PXIe-7975R FPGA board with NI-5782 high bandwidth digital IO at 125 MHz sampling rate. Special care can be taken to minimize the FPGA fixed point arithmetic quantization error for precise integer periods integration. The high-speed PXIe-7975R FPGA can process data from the active probe readout circuitry and can provide the lock-in amplifier output to the PXIe-7868R FPGA, which can handle the scanning pattern generation, regulation, and image data acquisition. An event driven state machine can be implemented in real time for user interface event handling, controller tuning, and/or FPGA resource coordination. Real time 2D/3D topography visualization and recording can also be implemented, for example for user convenience considerations.

FIG. 6C represents one embodiment of a lock-in amplifier that can be used in conjunction with the present disclosures. Other configurations are also possible. By way of one non-limiting example, an analog implementation of a lock-in amplifier can be used. While it may have a lower performance compared to a digital one in terms of the demodulation speed, it can also have a significantly lower cost for implementation. This is because the analog components can reduce the computational load used by the data acquisition system. There can essentially be a trade-off between performance and cost. Additional information about lower cost configurations is provided further below.

While the present disclosure describes devices, systems, and methods suitable for use where standard AFMs are not suitable, the present disclosure also provides for aspects that can be applied to standard AFM set-ups. For example, the present disclosure can allow for a cantilever of an active probe to be optimized in all directions.

Modular Low-Cost Educational AFM Design

Figure 7:
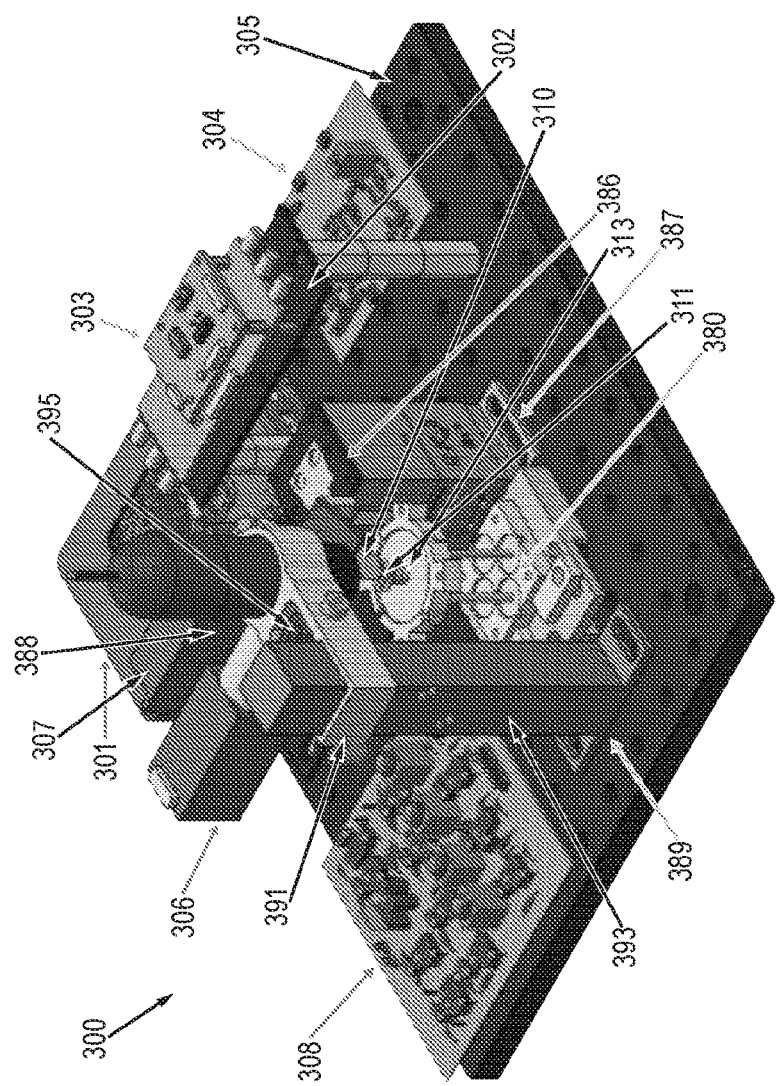
FIG. 7 is a perspective view of another exemplary embodiment of an Atomic Force Microscope (AFM) system set-up.

In one non-limiting alternative embodiment, a modular low-cost AFM system 300 can be designed for precision instrumentation education. Both these designs are centered around an active cantilever probe, however, this design can be much more affordable with an overall cost below approximately USD$4000. The overall design of the low-cost AFM system 300 is shown in FIG. 7. To realize the design at low cost, the positioning system and signal processing electronics can be redesigned to work with the myRIO-1900 data acquisition system 301, produced by National Instruments (NI) Corporation of Austin, Texas.

FIG. 7 provides for some non-limiting components that can be used in conjunction with the system 300 to interface with the data acquisition system 301. One such component is a probe electronics holder 302, which as shown can be configured to receive or otherwise hold an active probe driver 303. The system 300 can also include a signal generator and demodulator 304. In the illustrated embodiment the signal generator and demodulator 304 is disposed on a build plate 305 since this illustrates a bench model, and a person skilled in the art will recognize other ways by which the signal generator and demodulator 304 can be disposed in and/or used in conjunction with the system 300.

The system can include a probe holder 386 to receive an active probe 310 and a coarse positioner 387 to help position the location of the holder 386, and thus an active probe 310 held by the probe holder 386, with respect to a sample holder 313 that holds a sample 311. In the illustrated embodiment, the probe holder 386 provides for a snap-fit to receive and hold the probe 310 at a desired location with respect to the sample holder 313 and sample 311, although a person skilled in the art, in view of the present disclosures, will understand others ways and other positions by which a probe can be held with respect to a sample and/or sample holder by a probe holder, and other ways of moving the probe holder 386 in lieu of, or in addition to, the coarse positioner 387.

A variety of optical components, and devices and other components that can be used to control the optical components, can also be used in conjunction with the system 300. In the illustrated embodiment, an optical microscope 388 disposed on an adjustable gantry 389 is provided. The moveable gantry allows for movement along a z-axis (up-and-down) based on a bracket 391 attached to a post 393, and the post itself can be moved along an x-axis and a y-axis defined by the length and width of the plate 305. A gear 395 can be used to change an angle of the microscope 388 with respect to the holder 313 and/or the sample 311. Various electronics and mechanical components can be used to help operate various components of the system 300, including but not limited to a stepper motor 306, a stepper driver 307, and a further stepper driver 308. A multi-actuated buzzer scanner 380 is also provided to help control the location of the sample holder 313 and the sample 311 with respect to the probe 310. Additional details about the buzzer scanner 380 are provided below. The various components of the system 300, and the operation of the same, will be understood by a person skilled in the art in view of the present disclosures, and thus a detailed review of how each component of the system 300 operates with respect to the others is unnecessary.

Low-Cost Positioning System and Driver Design

Figure 8:
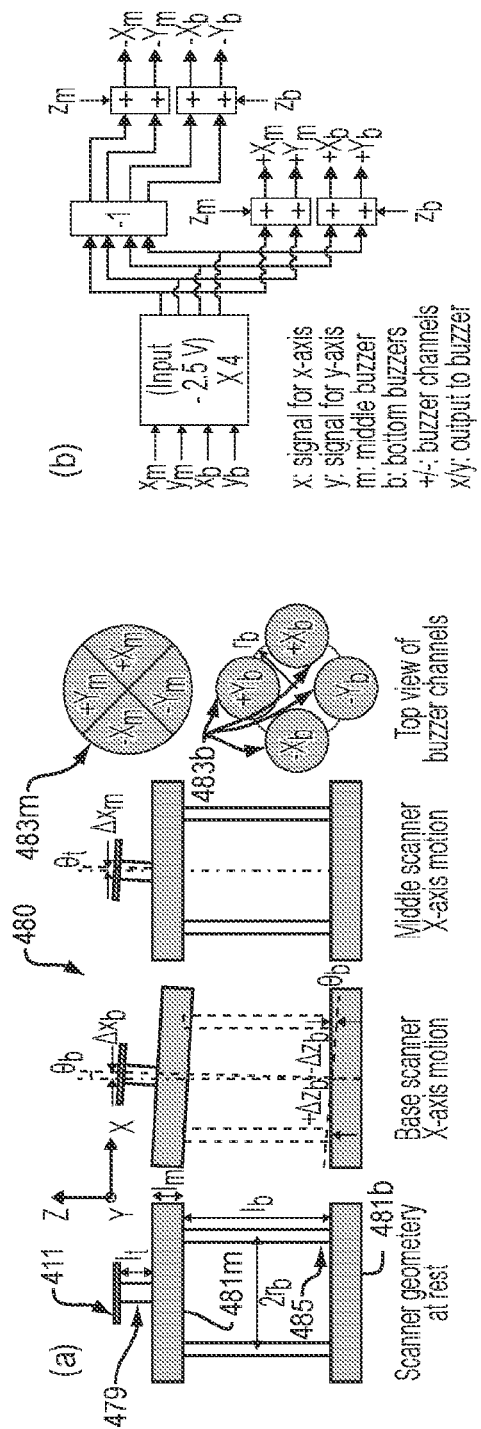
FIG. 8 is a schematic illustration of one exemplary embodiment of a multi-actuated scanner with buzzer actuators that can be used in conjunction with a system like the system of FIG. 7.

A multi-actuated scanner with buzzer actuators can be designed by tacking two different configurations. An example geometric configuration of a scanner 480 is shown in FIG. 8, portion (a), with parameter labels. A bottom scanner 481b can include four buzzers 483b with approximately 15 millimeters diameter positioned evenly around a circle having a radius ($r_b$) of approximately 11.5 mm. Four aluminum rods 485 each having a length ($l_b$) of approximately 1.5 inches and a diameter of approximately 0.125 inches can be used to connect a bottom layer 481b to a middle layer 481m. For the middle scanner 481m, a large buzzer 483m having a diameter of approximately 30 millimeters can be used with its electrode approximately evenly divided into four quadrants. A magnetic pillar 479 having a length ($l_t$) of approximately 0.375 inches and a diameter of approximately 0.3125 inches can be glued or otherwise adhered to an approximate center of the large buzzer 483m. A sample puck 411 can be magnetically attached on top of the magnetic pillar 479. The scanner structure can be 3D printed for cost-efficiency and ease of fabrication. Using machined metal structures can be used to improve the dynamic performance.

As shown in portion (b) of FIG. 8, four digital-to-analog converters (DAC) with approximately a $0-V$ range on the myRIO MXP connector from National Instruments (NI) Corporation of Austin, Texas can be used to control the in-plane motions for both the bottom buzzer 483b and middle buzzer 483m. Two myRIO MSP connectors +/−10 V DAC, also from National Instruments (NI) Corporation of Austin, Texas, can be used for the out-of-plane motion. Multiple OPA445 operational amplifiers, from Texas Instruments of Dallas, Texas, can be used to realize the functional groups of scaling and addition to drive the buzzer scanner.

With externally applied voltage, the buzzer 483m can deform approximately at the center. The out-of-plane motion can be generated by applying common mode voltage to all four quadrants. The in-plane scanning motion can be generated by applying differential voltage to the buzzers 481b along the desired motion direction. The performance of the scanner can be verified with a SIOS SP-120 laser interferometer, from SIOS Meßtechnik GmbH of Ilmenau, Germany. With approximately +/−30 V voltage driving, the bottom buzzers 481b can produce approximately 16 micron square in-plane range and approximately 3.75 micron out-of-plane range. The middle buzzer 483m can produce approximately 2.5 micron square in-plane range and approximately 8 micron out-of-plane range. Due to the imperfect alignment, motion coupling between the out-of-plane axis and the in-plane axes can be approximately in the range of about 1.25% to about 1.75%. An in-plane coupling at approximately 3% between the X-axis and the Y-axis can be observed. The in-plane bandwidth of the scanner 480 can be approximately 75 Hz, which can be sufficient for AFM imaging. The multi-actuated scanner design provides more flexibility in operation for scanning with different range and resolution. The bottom four buzzers 483b, for example, offer a larger in-plane range but a smaller out-of-plane range compared to the middle buzzer 483m with four quadrants.

For probe sample engagement, the DS40-XYZ Compact Dovetail Linear Stage, sometimes referred to as a positioner, from Newport Corporation of Franklin, MA, remains the same. However, a Nema 11 stepper motor with 100:1 gear reduction from StepperOnline of the OMC Corporation Limited from Nanjing City, China, can be used to replace the Oriental motor for cost reduction.

Probe Actuation and Demodulation Circuits

With the limited sampling rate and FPGA resources on the myRIO system, the FPGA-based high throughput digital lock-in amplifier discussed previously with respect to FIG. 6C can be difficult if not impossible to implement. An analog circuit can be designed to assist the excitation and demodulation of the cantilever resonance. For resonance excitation, for example, an AD9833 integrated circuit (IC) can be used to generate a sine wave with direct digital synthesis. An approximately 20 MHz square wave generated by the digital output line can provide a reference clock to the AD9833 IC. The desired frequency and phase can be specified with serial peripheral interface (SPI) communication. The generated sine wave can have valleys and peaks approximately in the range of about 38 mV to about 650 mV. The signal can then be passed through operational amplifiers, for example to remove the offset and increase the gain to drive the cantilever heater using half resonance frequency drive.

Figure 9:
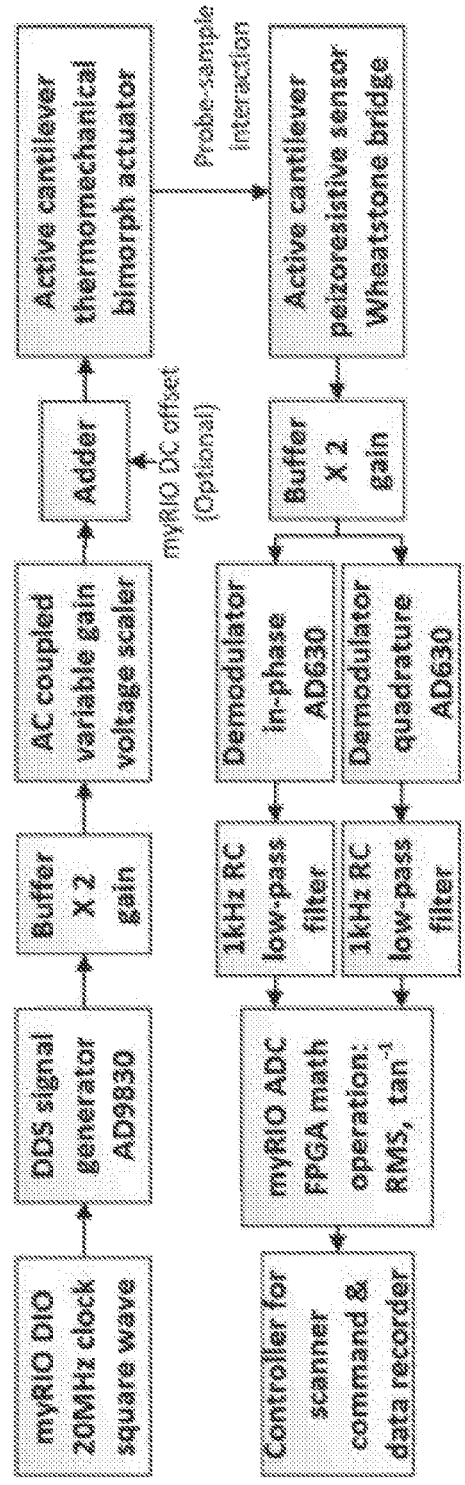
FIG. 9 is a block diagram of one exemplary embodiment an overall signal path of a resonance excitation and demodulation that can be used in conjunction with a system like the system of FIG. 7.

For oscillation demodulation, two AD630 IC chips can be configured as a lock-in amplifier for synchronous demodulation. Each AD630 can serve as a variable gain amplifier with approximately +/−2 gain where the sign of the gain can be controlled, at least in part, by the myRIO digital lines with, for example, a square wave at the cantilever resonance frequency. A low-pass filter at approximately 1 kHz can be used to extract the envelope. If two channels of the demodulator with square wave inputs offset by approximately 90 degree are used to obtain signals $z_{cos}$ and $z_{sin}$, these signals can be equivalent to the moving average filter output in the digital lock-in amplifier. Both the amplitude and the phase can then be computed digitally on the myRIO FPGA for imaging control. The overall signal path of the resonance excitation and demodulation functional block diagram is shown in FIG. 9. A person skilled in the art, in view of the present disclosures, will understand how to read the block diagram of FIG. 9, so an explicit description of the same is unnecessary. The components, and actions associated with the components, are either labeled or otherwise identified in the figure, or are understood by a person skilled in the art. With these new designs of key components, the overall cost of the AFM can be significantly reduced.

Observations

A number of observations were made by evaluating the same sample imaged with an uncoated active probe in air, a coated active probe in air, and a coated active probe in crude oil A number of issues can arise when operating in liquid environments. One of these is that upon moving the probe from a gas (air) into a liquid environment, its resonance frequency often shifts due to added mass of the liquid. This shift can be confused for engagement with the sample for reduced oscillation amplitude. Several other resonance frequency shifts occur at the end of the engagement upon approaching the solid surface. Hence, several cantilever frequency sweeps can be conducted to ensure the actual surface of the sample is reached.

Second, depending on the density and viscosity of the liquid, the first resonance frequency can become significantly lower such that the amplitude demodulation speed is too slow. In this case, second mode of the resonance frequency can be utilized for imaging.

Finally, due to the surface tension and wetting effects of liquids, residuals of the liquid remain on the polymer coating of the probe after experiment. After drying in air, the residual particles can change the mechanical properties of the probe or react with liquid in the next experiment. Therefore, it is typically necessary to clean the probe in chemical solution to dissolve residual particles. The probe can be rinsed, for example, in deionized water and then dried in a clean environment to avoid dust attachment.

In addition to the increase of probe mass, stiffness, and resonance frequency that results from the coating active probes as provided for herein, the coating can create an additional non-linear effect after an extended time of operation. From optical microscope videos of actuation of a coated active probe in air, visual changes of the coating can be observed. Further, the disclosures pertaining to coatings and piezoresistive readouts allows for the probes and methods provided for herein to be used in conjunction with performing AFM measurements in blood. Prior to the present disclosure, AFM has not been used directly for measurements in untreated liquid blood or other opaque liquids, but the present disclosures allows for such measurements.

By applying a protective coating to an active cantilever probe, the new capability of harsh opaque liquid imaging for AFM system is enabled. Any side effects of reduced probe sharpness and non-linearity due to thermomechanical stress induced fatigue do not reduce the usefulness of such technique for tapping mode imaging. In some instances, it may beneficial for the thickness of the coating to be reduced for smaller added mass. Further, the overall probe stiffness increase caused by the coating may be minimized to maintain original probe oscillation amplitude for imaging sensitivity considerations. Still further, bonding strength of the coating with the probe may be improved to sustain long-time operation without added non-linearity. And still further, the overall coated area can be increased to cover the entire electronics area, thus allowing for deeper immersion into the liquid environment.

While dip coating is one technique provided for applying the coating, a variety of other techniques may also be implemented without departing from the spirit of the present disclosure. By way of non-limiting example, vapor deposition techniques can be use do add the coating at least because it offers good bonding and atomic level thickness control. However, the development of such coating may require augmentation of the nano-fabrication process, which may require significant investment of time and capital for development. By way of further non-limiting example, a parylene coating may be applied, which can allow for control of a coating thickness below one micron. Parylene coating can also resist harsh chemical environments and be applied after probe fabrication with current design.

Overall, the present disclosure extends the capability of AFM systems to operate in opaque liquid environments. The design, fabrication, and coating of active cantilever probes are presented. A versatile AFM system is custom designed for operation in various range, bandwidth, and probe configurations. Coating and system performance are verified with imaging in vinegar, crude oil, and immersion test in blood sample.

To the extent the present disclosure describes the devices and methods provided for herein being suitable for use in an opaque environment, a person skilled in the art will understand what qualifies as being opaque. Transparency and opaqueness is dependent, at least in part, on the depth of the immersion. A person skilled in the art, even for a transparent liquid, will understand that a deeper immersion can cause problems if the light intensity decreases. These potential issues are circumvented by the active probes of the present disclosure. In conventional AFM (e.g., using a laser source of approximately 635 nm), if light intensity is reduced to below approximately 10% when propagating through the liquid environment for a distance approximately 3 millimeters or longer, a conventional AFM probe would typically not be suitable for imaging the environment. This determination is based on experience of inventors involved in the present disclosure.

Further, to the extent the present disclosure describes the devices and methods provided for herein being suitable for use in a harsh or chemically harsh environment, a person skilled in the art will understand what qualifies as a harsh environment. Generally, it can be an environment that includes agents that react with a native material of the object (i.e., the probe, in which case can include one or more of Si, $SiO_2$, $Si_3N_4$, Al, and other potential metals for heating). Accordingly, while disclosures herein include a chemically harsh environment that is acidic (having a value of pH lower than approximately 7, or in some instances a pH level below 5; in some instances, a harsh environment can exist where the environment has a pH level greater than 9), chemically harsh environments can alternatively, or additionally, be dependent on other aspects of the environment that impact the native material of the object beyond acidity (e.g., oxidation, environment temperature).

One skilled in the art will appreciate further features and advantages of the disclosures based on the provided for descriptions and embodiments. Accordingly, the inventions are not to be limited by what has been particularly shown and described. For example, while the present disclosure describes using the devices, systems, and methods provided for herein for topography imaging, the disclosure allows for many types of measurements to be made in opaque and/or chemically harsh environments, such as mechanical properties of an environment (e.g., magnetic-related properties, electrical properties if a conductive coating is provided, etc.). No matter the use, the thin coating on probes provided for in the present disclosure is provided in a manner such that the coating has a negligible impact, or no impact, on the abilities of the AFM to obtain the information sought (e.g., images, properties, measurements, etc.). All publications and references cited herein are expressly incorporated herein by reference in their entirety.

Examples of the above-described embodiments can include the following:

1. An active probe, comprising:
    a substrate, the substrate including a cantilever having a base region and a tip region;
    a thermomechanical actuator associated with the cantilever and configured to cause the cantilever to deflect;
    a piezoresistive stress sensor disposed on the cantilever at the base region and configured to measure deflection of the cantilever at the tip region; and
    a thin coating disposed on the cantilever and the piezoresistive stress sensor, the coating being bonded to the substrate, thermally conductive, and having a low thermal resistance,
    wherein the thin coating is configured to have a negligible impact, or no impact, on at least one of a mass of the active probe, a residual stress of the cantilever, or a stiffness of the active probe.
2. The probe of claim 1, wherein the thermomechanical actuator comprises a heating element.

3. The probe of claim 1 or 2, wherein the thermomechanical actuator comprises a plurality of layers of the substrate with at least one layer of the plurality of layers having a different coefficient of thermal expansion than another layer of the plurality of layers.

4. The probe of claim 3, wherein a first layer of the plurality of layers comprises a silicon layer, a second layer of the plurality of layers comprises an $SiO_2$ layer, and a third layer of the plurality of layers comprises a metal heater layer.

5. The probe of claim 4, wherein a thickness of at least one of the first, second, and third layers is different than a thickness of another of the first, second, and third layers.

6. The probe of claim 5, wherein a thickness of the each of the first, second, and third layers is different.

7. The probe of any of claims 1 to 6, wherein a thickness of the thin coating is substantially uniform across a surface area of the substrate.

8. The probe of any of claims 1 to 7, wherein a thickness of the thin coating is approximately in the range of about 0.1 micrometers to about 10 micrometers.

9. The probe of any of claims 1 to 8, wherein the thin coating is configured to have a negligible impact, or no impact, on each of the mass of the active probe, the residual stress of the cantilever, and the stiffness of the active probe.

10. The probe of any of claims 1 to 9, wherein the thin coating is configured to be chemically inactive in an opaque liquid environment.

11. The probe of claim 10, wherein the opaque liquid environment comprises at least one of a crude oil, whole blood, and sulfuric acid.

12. The probe of any of claims 1 to 11, wherein the thin coating covers an entirety of the piezoresistive stress sensor.

13. The probe of any of claims 1 to 12, wherein the thin coating comprises parylene.

14. The probe of any of claims 1 to 12, wherein the thin coating comprises a vapor deposition material.

15. The probe of any of claims 1 to 12, wherein the thin coating comprises a photoresist identifiable as "Positiv 20."

16. The probe of any of claims 1 to 15, wherein one or more piezoresistors of the piezoresistive stress sensor is disposed at one or more high stress locations for bending of the cantilever.

17. The probe of any of claims 1 to 16, wherein a linear relationship exists between a voltage across the piezoresistive stress sensor and deflection of the cantilever.

18. The probe of any of claims 1 to 17, wherein the piezoresistive stress sensor comprises a plurality of piezoresistors disposed in a Wheatstone bridge configuration such that the configuration diminishes an effect of at least one of temperature drift and crosstalk.

19. The probe of any of claims 1 to 18, wherein the probe is configured to perform topography imaging.

20. The probe of claim 19, wherein the probe is configured to perform topography imaging without either of a light source or an optical system.

21. The probe of claim 19 or 20, wherein the probe is configured to operate in an opaque environment.

22. The probe of claim 21, wherein the opaque liquid environment comprises at least one of a crude oil, whole blood, and sulfuric acid.

23. A scanning electron microscope comprising the active probe of any of claims 1 to 22.

24. A system comprising a plurality of the active probes of any of claims 1 to 22, the plurality of the active probes being configured in an array for simultaneous imaging of a large area.

25. A method for performing topography imaging, comprising:
    disposing an active cantilever probe into an opaque liquid environment; and
    performing topography imaging with the active cantilever probe, without either of a light source or an optical system.

26. The method of claim 25, wherein the opaque liquid environment comprises at least one of a crude oil, whole blood, and sulfuric acid.

27. The method of claim 25 or 26, wherein the opaque liquid environment comprises a harsh chemical environment.

28. The method of any of claims 25 to 27, wherein performing topography imaging with the active cantilever probe further comprises adjusting a frequency measured by the active cantilever probe due to moving the active cantilever probe from an outside environment to the opaque liquid environment.

29. The method of claim 28, wherein adjusting a frequency measured by the active cantilever probe further comprises performing a plurality of frequency sweeps.

30. The method of claim 28 or 29, wherein adjusting a frequency measured by the active cantilever probe further comprises operating a second mode of a resonance frequency.

31. The method of any of claims 25 to 30, further comprising forming a thin coating on the active probe.

32. The method of claim 31, wherein forming a thin coating on the active probe further comprises dip coating the active probe to form the thin coating thereon.

33. The method of any of claims 25 to 30, wherein the active probe includes a thin coating that is thermally conductive, has a low thermal resistance, and is configured to have a negligible impact, or no impact, on at least one of a mass of the active probe, a residual stress of the active probe, or a stiffness of the active probe.

34. The method of any of claims 31 to 33, wherein a thickness of the thin coating is substantially uniform across a surface area of a top surface of the active probe.

35. The method of any of claims 31 to 34, wherein a thickness of the thin coating is approximately in the range of about 0.1 micrometers to about 10 micrometers.

36. The method of any of claims 31 to 35, wherein the thin coating is configured to have a negligible impact, or no impact, on each of the mass of the active probe, the residual stress of the active probe, and the stiffness of the active probe.

37. The method of any of claims 31 to 36, wherein the thin coating is configured to be chemically inactive in the opaque liquid environment.

What is claimed is:
1. An active probe, comprising:
   a substrate, the substrate including a cantilever having a base region and a tip region;
   a thermomechanical actuator associated with the cantilever and configured to cause the cantilever to deflect;
   a piezoresistive stress sensor disposed on the cantilever at the base region and configured to measure deflection of the cantilever at the tip region; and
   a thin coating disposed on the cantilever and the piezoresistive stress sensor, the coating being bonded to the substrate, thermally conductive, and having a thermal resistance, in which a thermal time constant $\tau$ is less than $1/f$, where $f$ is a cantilever resonance frequency, wherein the thin coating is configured to have a negligible impact, or no impact, on at least one of a resonance frequency or a maximum output amplitude on the cantilever and the piezoresistive stress sensor, the negligible impact being characterized by at least one of the thin coating increasing the resonance frequency by less than about 11% or decreasing the maximum output amplitude less than about eleven-fold, wherein the thin coating comprises a photoresist identifiable as "Positiv 20."

2. The probe of claim 1, wherein the thermomechanical actuator comprises a heating element.

3. The probe of claim 1, wherein the thermomechanical actuator comprises a plurality of layers of the substrate with at least one layer of the plurality of layers having a different coefficient of thermal expansion than another layer of the plurality of layers.

4. The probe of claim 1, wherein a thickness of the thin coating is substantially uniform across a surface area of the substrate.

5. The probe of claim 1, wherein a thickness of the thin coating is approximately in the range of about 0.1 micrometers to about 10 micrometers.

6. The probe of claim 1, wherein the thin coating is configured to be chemically inactive in an opaque liquid environment.

7. The probe of claim 6, wherein the opaque liquid environment comprises at least one of a crude oil, whole blood, and sulfuric acid.

8. The probe of claim 1, wherein the thin coating comprises parylene.

9. The probe of claim 1, wherein a linear relationship exists between a voltage across the piezoresistive stress sensor and deflection of the cantilever.

10. The probe of claim 1, wherein the probe is configured to perform topography imaging.

11. The probe of claim 10, wherein the probe is configured to perform topography imaging without either of a light source or an optical system.

12. The probe of claim 10, wherein the probe is configured to operate in an opaque environment.

13. The probe of claim 1, wherein the negligible impact is characterized by the thin coating increasing the resonance frequency by less than about 11% and decreasing the maximum output amplitude less than about eleven-fold.

* * * * *